US011890252B2

(12) United States Patent
Henriksson et al.

(10) Patent No.: US 11,890,252 B2
(45) Date of Patent: Feb. 6, 2024

(54) DEVICE FOR MASSAGING MUSCLES IN AN ORAL CAVITY

(71) Applicant: GOODSOMNIA AB, Stockholm (SE)

(72) Inventors: Hans-Jorgen Friedrich Henriksson, Stockholm (SE); Friedrich Heinrich Hilmar Simon, Wurzburg (DE)

(73) Assignee: GOODSOMNIA AB, Stockholm (SE)

( * ) Notice: Subject to any disclaimer, the term of this patent is extended or adjusted under 35 U.S.C. 154(b) by 1105 days.

(21) Appl. No.: 16/311,935

(22) PCT Filed: Jun. 20, 2017

(86) PCT No.: PCT/SE2017/050678
§ 371 (c)(1),
(2) Date: Dec. 20, 2018

(87) PCT Pub. No.: WO2017/222460
PCT Pub. Date: Dec. 28, 2017

(65) Prior Publication Data

US 2019/0175442 A1 Jun. 13, 2019

(30) Foreign Application Priority Data

Jun. 20, 2016 (SE) .................................... 1650863-2

(51) Int. Cl.
*A61H 21/00* (2006.01)
*A61H 15/00* (2006.01)

(52) U.S. Cl.
CPC ............. *A61H 21/00* (2013.01); *A61H 15/00* (2013.01); *A61H 15/0085* (2013.01);
(Continued)

(58) Field of Classification Search
CPC ........ A61H 7/002; A61H 7/004; A61H 7/005; A61H 7/008; A61H 2007/009;
(Continued)

(56) References Cited

U.S. PATENT DOCUMENTS 2,227,276 A * 12/1940 Salit .................... A61H 23/0218 601/134
2,512,536 A * 6/1950 Zadek ................ A61H 23/0254 601/103
(Continued)

FOREIGN PATENT DOCUMENTS

CN 201921092 U 8/2011
CN 102293683 A 12/2011
(Continued)

OTHER PUBLICATIONS

National Intellectual Property Administration of the People's Republic of China, The First Office Action, Application No. 201780038379.7, Device for Massaging Muscles in an Oral Cavity, dated Oct. 10, 2020.

(Continued)

*Primary Examiner* — Colin W Stuart
*Assistant Examiner* — Douglas Y Sul
(74) *Attorney, Agent, or Firm* — Flener IP & Business Law; Zareefa B. Flener

(57) ABSTRACT

The invention relates to a device (1) for massaging muscles in the oral cavity comprising a body (3) with drive means (5) and a power unit (7), an extending element (9) detachably coupled to the body (3), and two massage units (11) coupled to an end portion (13) of the extending element (9), wherein the massage units (11) operate with an alternately rotating movement, which rotates about a rotational axis (15) essentially perpendicular to the end portion (13). The invention further relates to a method for massaging muscles in the oral cavity such a device (1), wherein the massage units (11) massage the muscles in the oral cavity with an alternately rotating movement. Even further, the method may be used for reducing or eliminating snoring by massaging muscles in the oral cavity using such a device (1).

11 Claims, 3 Drawing Sheets

(52) U.S. Cl.
CPC .................. *A61H 2015/005* (2013.01); *A61H 2015/0007* (2013.01); *A61H 2015/0021* (2013.01); *A61H 2015/0035* (2013.01); *A61H 2201/0153* (2013.01); *A61H 2201/1481* (2013.01); *A61H 2201/1671* (2013.01)

(58) Field of Classification Search
CPC ................ A61H 15/00; A61H 15/0085; A61H 15/0078; A61H 2015/0007; A61H 2015/0021; A61H 2015/005; A61H 23/02; A61H 23/006; A61H 2201/1481; A61H 2201/1671; A61H 2201/0153; A61H 2201/1676; A61H 2201/1678; A61H 21/00; A61H 13/00; A61F 5/56; A61F 5/566; A61C 17/32; A61C 17/3418; A61C 17/3427; A61C 17/3436
See application file for complete search history.

(56) References Cited

U.S. PATENT DOCUMENTS

| | | | | |
|---|---|---|---|---|
| 3,664,331 | A * | 5/1972 | Filipovici | A61H 23/0254 601/97 |
| 4,157,712 | A | 6/1979 | Gaynor | |
| 4,834,075 | A * | 5/1989 | Guo | A61H 7/004 601/89 |
| 4,909,241 | A * | 3/1990 | Burn | A61H 13/00 601/139 |
| 5,584,690 | A | 12/1996 | Maassarani | |
| 6,446,295 | B1 | 9/2002 | Calabrese | |
| 7,181,799 | B2 | 2/2007 | Gavney, Jr. et al. | |
| 9,265,338 | B1 * | 2/2016 | Cygler | A61C 17/22 |
| 2001/0020314 | A1 | 9/2001 | Calabrese | |
| 2002/0152564 | A1 | 10/2002 | Blaustein et al. | |
| 2002/0198478 | A1 * | 12/2002 | Tsai | A61H 15/0085 601/112 |
| 2003/0199796 | A1 * | 10/2003 | Yamazaki | A61H 7/007 601/134 |
| 2003/0204153 | A1 | 10/2003 | Chen | |
| 2006/0064833 | A1 | 3/2006 | Jacobs | |
| 2006/0117506 | A1 * | 6/2006 | Gavney | A47L 13/12 601/142 |
| 2008/0221387 | A1 * | 9/2008 | Gaboury | A46B 15/0002 600/38 |
| 2010/0092916 | A1 * | 4/2010 | Teixeira | A61H 23/02 15/167.1 |
| 2010/0242193 | A1 * | 9/2010 | Harrison | A61C 17/222 15/176.1 |
| 2010/0331745 | A1 * | 12/2010 | Yao | A61H 23/06 601/101 |
| 2011/0087141 | A1 | 4/2011 | Wagy et al. | |
| 2016/0271009 | A1 * | 9/2016 | Giraud | A61N 1/0412 |
| 2017/0000593 | A1 * | 1/2017 | Sayles | A61C 17/3445 15/176.1 |

FOREIGN PATENT DOCUMENTS

| | | | |
|---|---|---|---|
| GB | 191511156 | A | 7/1916 |
| JP | 2005279203 | A | 10/2005 |
| JP | 2013198593 | A | 10/2013 |
| NZ | 598991 | A | 10/2013 |
| RU | 2292857 | C2 | 2/2007 |
| RU | 2469631 | C2 | 12/2012 |
| RU | 2575058 | C2 | 10/2016 |
| WO | WO03/028581 | A1 | 4/2003 |
| WO | WO2004/062573 | A2 | 7/2004 |
| WO | 2010108274 | A1 | 9/2010 |
| WO | WO2015/139869 | A1 | 9/2015 |
| WO | WO2015/146272 | A1 | 10/2015 |
| WO | WO2016/015785 | A1 | 2/2016 |

OTHER PUBLICATIONS

Russian Office Action for Application RU2019101434, search completed Sep. 28, 2020 (provides a listing of cited art without an English translation).

Australian Office Action for application AU2017281055, report dated Oct. 2, 2020.

European Patent Office search report for application EP17733070.1, dated Oct. 3, 2020.

International Search Report for PCT/US03/41401 (Same as WO2004/062573A3), Published Oct. 18, 2004.

* cited by examiner

DEVICE FOR MASSAGING MUSCLES IN AN ORAL CAVITY

TECHNICAL FIELD

The present invention relates to a device for massaging muscles in an oral cavity. In particular, the present invention relates to a device for alleviation of snoring by means of massaging the muscles in the oral cavity. Furthermore, the present invention relates to a method for massaging the muscles in an oral cavity, in particular for reducing or eliminating snoring by means of strengthening said muscles.

BACKGROUND AND PRIOR ART

To increase muscle mass and stimulate muscle growth exercise of the muscles is commonly known as to achieve such a goal. It is also known that muscles which are not being used, as in not contracted regularly, will weaken over time. Weakened muscles will not be able to handle stresses and loads and weakened muscles will also lose their shape and become more flaccid over time. However, for certain muscles and/or certain conditions for a person, regular exercise may not be possible. This may be the case for people subjected to injuries and/or for the case of more or less autonomous muscles wherein a muscle or muscle group cannot be contracted by means of the person.

Electrical muscle stimulation (EMS) is one known way to stimulate muscles by means using electric impulses to cause muscle contraction. This type of treatment may not always be comfortable for a person as the use of electricity on the body could be perceived as intimidating.

Another known form of treatment is biomechanical stimulation (BMS) which is used in the field of physical therapy and training or similar as a way to massage and stimulate the muscle fibres of muscle tissue to strengthen said muscles. The object of BMS is to achieve a stimulation of the muscles by means of employing low amplitude, low frequency mechanical stimulation to exercise musculoskeletal structures for the improvement of muscle strength, power, and flexibility. The stimulation of the muscles by means of BMS further works as a massage for the muscles, increasing the flow of blood and removes waste products accumulated within a muscle over time.

The use of BMS is most commonly performed by means of vibrations, which are applied on the muscles on which the treatment is wanted by using some sort of vibrating device. For example, vibration plates are known to apply full body vibrations to a person standing on said plate as a way to stimulate muscle contractions. There are also smaller devices which can be used to apply vibrations to particular muscle groups to isolate the muscle stimulation to those groups. Too much exposure of vibrations may however be harmful as too much exposure to vibrations may lead to fatigue in the muscles instead.

One particular muscle group which gives rise to negative effects when becoming more flaccid over time are the muscles in the soft palate in the oral cavity. When said muscles become looser and drop down a person is more likely to experience snoring when sleeping. Snoring is a very common problem for a lot of people and treatment without turning to surgery is preferred as surgery may provide health risks and the results have been shown to only be temporary.

WO 2016/015785 A1 shows a device for massaging an oral cavity by means of vibrations. The device comprises a main body with a battery unit and a vibration generating device. The device further comprises an end extension, attached to the main body, which can freely oscillate in at least one spatial dimension. The device is meant to be used by inserting the device in the mouth and massaging the muscles in the oral cavity by means of said vibrations. The massaging of said muscles will increase their strength and alleviate snoring as a result.

There are however drawbacks with the above-mentioned device. As the muscles are located in the oral cavity they are very sensitive to exposure as a treatment of the oral cavity may lead to gag reflexes for a person using the device. Vibrations in this area may also be unpleasant to a user as a vibrating unit may be difficult to hold in the right place, and the use of vibrations may be a cause of a translation of vibration beyond the targeted area, which could further increase gag reflexes and unpleasantness for a user. The needed time for a treatment procedure is therefore also of importance as a prolonged treatment increases the risk of experiencing the problems described above.

There is therefore a need for an improved device for massaging the muscles in the oral cavity which alleviates the issues with prior art. There is further a need for a device which shortens the time needed to perform the massage to improve the comfort experienced by a user of the device.

SUMMARY OF THE INVENTION

The object of the present invention is to provide a device for massaging muscles in an oral cavity, in particular for reducing or eliminating snoring by means of strengthening said muscles by means of the stimulation of said massaging. The present invention further relates to a method for massaging the muscles in an oral cavity, in particular for reducing or eliminating snoring by means of strengthening said muscles. Even further, the present invention relates to a device and a method for reducing snoring by means of strengthening the muscles in an oral cavity, which alleviates the drawbacks of prior art. Even further, the present invention relates to a device and a method for reducing or eliminating snoring, wherein the device and method are easy to use and produces fast results for lowering the time needed to perform said massaging.

Moreover, an object of the invention is to provide a device and a method for reducing or eliminating apnea, through massaging muscles of the tongue in the oral cavity.

These objects are reached with the device, the device in use and the method as defined in the appended claims.

The object to provide a device for massaging muscles in an oral cavity, in particular for reducing or eliminating snoring by means of strengthening said muscles, is reached by means of a device comprising a body with drive means and a power unit, and an extending element detachably coupled to the body, said device being characterized in that the device comprises two massage units arranged on an end portion of the extending element, wherein the massage units operate with a rotating movement, which rotates about a rotational axis essentially perpendicular to the end portion, and wherein the rotating movement of massage units is an alternating rotation, alternating between a clockwise and an anti-clockwise rotational angular displacement. The two massage units may be arranged on opposite sides of said end portion. This has the advantage that a device is provided which device can strengthen muscles in an oral cavity by means of massaging said muscles with said device. By using an alternating rotational movement for said massaging a very effective and easy to use procedure is provided.

The rotational movement of the two massage units has the advantage that the massage units provide a non-interrupted and fluent movement due to the rotation, which in turn leads to a deep acting massage on the muscle tissue, stimulating muscle fibres deeper into said muscle, due to the contact between the muscle and the massage units not being interrupted. An even further advantage is that a rotational movement can be aligned with said muscles so that movement of a contact surface between the massage units and the direction of the fibres of said muscles are aligned. This in turn leads to an effective and deep acting massage of said muscles.

According to one aspect of the invention the frequency for the rotating movement is in the range of about 18 to about 30 Hz, e.g. about 20 to about 26 Hz, or about 22 to about 24 Hz. This has the advantage that frequencies which are established to be beneficial in the field of biomechanical stimulations, for the muscles in the soft palate, or the tongue, are being provided with the device. This is beneficial as it provides a means of strengthening said muscles which is hard to achieve by means of exercise or similar.

The alternating rotation, alternating between a clockwise and an anti-clockwise rotational angular displacement, has the advantage that a massaging movement of the massage unit is provided, wherein the massage unit is easier to hold in place, as a translational movement of the device due to a one-directional rotation in contact with the muscles is avoided. Thereby a massaging motion can be provided to the muscles in a back and forth movement along the length of the fibres in said muscles, which stimulates the muscle without creating a reactive force which moves the device away from the muscle.

According to one aspect of the invention a total angular displacement of the massage unit for a complete rotational displacement in each respective direction is 180° or less, e.g. 80° or less, e.g. 60° or less, e.g. 40° or less, in each respective direction. This has the advantage that the direction of the rotational movement is changed back and forth over a set distance over the circumference of the massage unit, which may be shaped to adjust a massaging contact surface of the massaging unit depending on the total angular displacement used.

This further has the advantage that the massage units may be rotated 180° to be able to be used on both sides. This is beneficial as both sides may have the same shape and be turned over if one side is worn out over time. Alternatively, the two sides may have different shapes, designed for different types of massages, and the turned 180° if the desired massage effect is to be changed.

According to one aspect of the invention the at least one massage unit comprises an essentially rounded shape in a cross-sectional plane seen in a direction along the rotational axis. This has the advantage that the massage contact surface, defined by the contact between the at least one massage unit and the muscle tissue on which it is used, will be smooth and pleasant to use for a person using the device.

According to another aspect of the invention a length of a distance between a circumference of the at least one massage unit and the rotational axis, seen in the cross-sectional plane of the at least one massage unit varies in size, the variation being in the range of about 0.5 to about 4 mm, e.g. about 0.5 mm to about 2.5 mm, e.g. about 1 mm to about 2.5 mm, depending on an angle of said distance originating from the rotational axis.

This has the advantage that the muscle fibres on which the device is used will move up and down due to the change in distance seen from the rotational axis when the massage unit is being rotated. This will in turn lift the muscle fibres subjected to the massage up and down which will create a stretching effect further stimulating the massage of the muscle.

The device comprises two massage units, arranged on opposite sides of the end portion of the extending element. This has the advantage that the two massage units hold the muscle firmly in place between said units, wherein both units can massage the muscle at the same time from both sides. This provides a highly efficient massage, as well as an easy to use device.

According to one aspect of the invention, the two massage units operate at different frequencies. This has the advantage that the different frequencies complement each other and provides a broader spectrum of massaging movement. Furthermore, the two separate frequencies also provide an interference wave pattern between the differences of said two individual frequencies. Said interference wave pattern increases the stimulation of the muscle by acting on the muscle with a pumping wave motion which increases the blood flow within said muscle.

According to one aspect of the invention one of the massage units operates at about 20 to about 26 Hz, and the other massage unit operates at an off-set frequency in the range of about 22 Hz to about 24 Hz. According to another aspect of the invention one of the massage units operates at about 22 Hz to about 26 Hz, and the other massage unit operates at an off-set frequency in the range of about 23 Hz to about 25 Hz. According to yet another aspect of the invention one of the massage units operates at about 23 Hz, and the other massage unit operates at an off-set frequency in the range of about 21 Hz to about 25 Hz. In still an aspect of the invention, one of the massage units operates at 23 Hz, and the other massage unit operates at an off-set frequency in the range of about 21 Hz to about 25 Hz.

Said frequency combinations have the advantages that the frequencies provided are very well suited for massaging muscles in soft palate in the oral cavity. Moreover, said dual frequencies provide an interference wave pattern.

The object to provide a method for massaging muscles in an oral cavity, is reached by means of a method using a device as herein described.

A fast and easy to use method is provided, wherein said method provides a deep acting muscle tissue massage in a very efficient way. This is advantageous as only short massage sessions are needed to strengthen said muscles. This further has the advantage that a method is provided which feels comfortable to a user whom is using said method to massage said muscles in an oral cavity.

According to one aspect of the invention the method is used for reducing or eliminating snoring, the method comprising massaging muscles in the oral cavity using a device according to the invention. This has the advantage that a method for reducing snoring is provided wherein the method helps to alleviate or eliminate snoring for a person on whom the massage is applied.

It is understood that a device as described herein suitable for massaging muscles of the oral cavity is equally suitable for massaging the tongue, as for massaging the palate of the oral cavity. Massaging the tongue may reduce or eliminate apnea.

According to one aspect, the method is intended for use by adolescents and/or adult people. An adolescent is defined herein as a person between the ages 13-19. An adult is defined as a person above the age of 19 years.

BRIEF DESCRIPTION OF THE DRAWINGS

Below is a description of, as examples, preferred embodiments of the invention with reference to the enclosed drawings, in which.

DETAILED DESCRIPTION OF THE INVENTION

Figure 1:
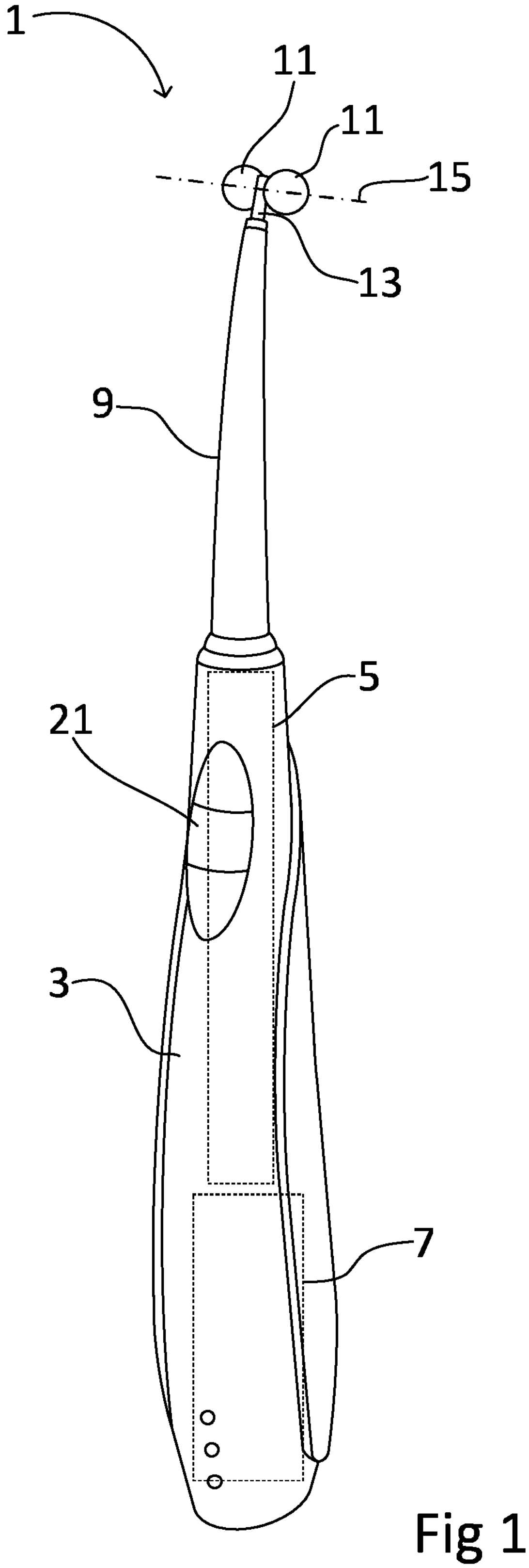
FIG. 1 schematically illustrates a perspective view of a device according to the invention, FIG. 2*a-c* schematically illustrates front views of alternative embodiments of massage units of a device according to the invention, and FIG. 3*a-d* schematically illustrates front views of massage units in different rotational positions pushing a muscle in different directions device according to the invention.

Hereinafter different embodiments of the invention will be described in detail. Reference numbers present are not to be viewed as restrictive in relation to the scope of the protection given by the patent claims, only as assistance in understanding the various technical features of the invention.

As will be realized the invention can be modified in various ways without deviating from the scope of the claims, and specific technical features and aspects of the invention described may be used individually, or be combined, to achieve a variety of combined technical features and embodiments of the invention. Hence, the description should be viewed as illustrative and not restrictive.

It should be noted that directions and movements mentioned hereinafter in the description are to be depicted as in relation to a person standing up using the device of the invention on the muscles in the soft palate of the oral cavity, unless stated otherwise. Hence, as a frame for reference, in general up/upwards or similar should be viewed as up towards the soft palate of a person.

According to one aspect of the invention a device 1 for massaging muscles in soft palate of an oral cavity is provided. The device 1 comprises a body 3 with drive means 5 and a power unit 7, an extending element 9 detachably coupled to the body 3, and two massage units 11 coupled to an end portion 13 of the extending element 9. The massage units may be coupled to opposite sides of the end portion 13. The power unit 7 is preferably a re-chargeable battery or similar which may be charged by connecting the device 1 to a regular household electrical socket, either directly or via a charging dock designed to fit the device 1. The drive means 5 may be any type of electrical motor or similar which may be operated by means of the power unit 7 to provide an operating motion for the device 1. The extending element 13 is preferably a hollow shaft, being arranged to be coupled to the body 3 of the device 1 to transfer the operating motion of the drive means 5 to the two massage units 11 arranged at opposite sides of the end portion 13 of said extending element 9. The length of the extending element 9 is designed to be suitable for reaching the soft palate in an oral cavity and may be approximately 10 cm or similar. The two massage units 11 of the device 1 is then operated by means of the drive means 5 with a rotating movement, which rotates back and forth about a rotational axis 15 being essentially perpendicular to the end portion 13. To use the device 1, a user turns the power on and inserts the extending element 9 into his/her mouth and engage the two massage units 11 to the muscles of the soft palate in the oral cavity. Thereby a rotating massaging movement may be provided to the muscles, to stimulate said muscle as a way to strengthen them and increase the flow of blood and the removal of waste products in said muscle. By strengthening these muscles snoring may be alleviated or eliminated, which is known in the art. The device 1 according to the invention may therefore provide a way to strengthening said muscles, which is difficult to achieve by means of regular exercise. Performance studies performed by the inventors have shown that even short periods of treatments, for ex ample as short as in the range of 10 seconds to 3 minutes, such as 20, 30, 40, 50 or 60 seconds a day alleviates or eliminates snoring for a large portion of people having such problems.

According to one aspect of the invention the frequency for the rotating movement is in the range of about 18 to about 30 Hz, e.g. about 20 Hz to about 26 Hz. The ideal frequency for massaging a muscle to strengthening and increasing the blood flow within said muscle is different for different muscles of the human body. For the muscles of the soft palate or the tongue in the oral cavity, clinical studies have shown that 23 Hz and frequencies around 23 Hz provides the best possible stimulation for these muscles. Hence, the most preferred frequencies provided by the device are about 21 Hz to about 25 Hz, e.g. about 22 Hz to about 24 Hz, e.g. 23 Hz, and/or close to 23 Hz. These frequencies provide excellent stimulation for the mentioned muscle group and hence excellent muscle toning and strengthening of those muscles is provided by means of using these frequencies with the device 1.

The rotating movement of the two massage units 11 is an alternating rotation, alternating between a clockwise and an anti-clockwise rotational angular displacement. As should be realized, the frequency for the rotating movement is thus to be perceived as a full cycle of back and forth motion of the massage unit 11, and not a full 360° turn of the same. The back and forth rotating movement provides an alternating massaging movement on the muscle fibres which stimulates the muscle similar to that of a back and forth regular massage while at the same time not being forced to release the engagement of the massage unit 11 towards the muscle.

A total angular displacement of the massage unit 11 for a complete rotational displacement in each respective direction is 180° or less. The total angular displacement may be altered coupled with the shape of the two massage units 11 to provide additional massaging movement for the muscles. Depending on which movements to be performed by means of the device 1, the angle of the total angular displacement may be changed. If only back and forth rotating massaging movement is desired, the angular displacement may be in the range of about 30° to about 50°. However, it is possible to provide additional massaging movement by means of the device 1 according to additional technical features which will be described. For these additional movements, the total angular displacement may be altered depending on the embodiment of the invention. This will be described in detail coupled to the specific technical features for these additional objects of the invention.

The two massage units 11 may further comprise essentially rounded shapes in a cross sectional plane seen in a direction along the rotational axis 15. A massage unit 11 may have various shapes such as an orb, a disc, a cylinder, a tube or similar. All these types of shapes are possible to use as they all may provide an essentially rounded cross sectional shape which will provide a smooth and pleasant contact surface towards the muscle when the device 1 is being used. The diameter of said rounded shape may vary to fit people of different sizes. The diameter of a massage unit 11 may typically be in the range of about 5 mm to about 12 mm, wherein the smaller size is used for adolescents and/or smaller people and the larger ones be used by larger built people.

The essentially rounded shape of a cross section of a massage unit 11 may however further be an asymmetrical rounded shape, wherein a length L of a distance 17 between a circumference 19 of the massage unit 11 and the rotational axis 15, seen in the cross-sectional plane of the massage unit 11 varies in size, the variation being in the range of about 0.5 mm to about 4 mm, e.g. from about 1 mm to about 2.5 mm, depending on an angle of said distance 17 originating from the rotational axis 15. This may be provided by elliptically shaped massage units 11, wherein said length L of the distance 17 to the circumference 19 from the rotational axis 15 thereby is varied depending on the angle of said distance 17. Further, the same effect may be achieved by having completely circle shaped massage units 11, seen as a cross section, but arranging the rotational axis 15 off-centre within the massage unit 11. A massage unit 11 may furthermore be designed by means of a combination of the two above variations to achieve larger changes in the rotational asymmetry for smaller angular displacements of a massage unit 11. Depending on the shape used for a massage unit 11 and the total angular displacement of a rotating massage movement provided by the device 1, different differences in the above described length of such a distance may be achieved. When one of the massage units 11 of a device 1 is placed in engagement with the muscles and being operated, an asymmetrical massage unit 11 will provide an oscillation of the muscle fibres due to changes in length L of the distance 17 between a contact surface point of the massage unit 11 in contact with the muscle, and the rotational axis 15. Said oscillation is preferably in the range of about 0.5 mm to about 4 mm, e.g. from 1 mm to about 2.5 mm in height difference, but may be altered to suit a specific person by changing the shape of the massage units 11 and/or the total angular displacement of the rotational massaging movement. Preferably the device 1 may be provided with a control unit for changing the total angular displacement provided by the device 1 to make the device more customizable for different users. The oscillation provided by this feature of the invention increases the massaging effect of the device 1 as the back and forth massaging movement is enhanced by stretching the fibres of the muscle simultaneously with the back and forth massage.

By using two massage units 11 the fibres of the muscle being massaged will naturally be held in place between the two opposite massage units 11 as they will provide a gap between them where the muscle may be placed. The two opposite massage units 11 will then further massage a portion of the muscle from two sides at the same time, which effectively increases the massaging effect due to increased stimulation from both sides of said muscle.

According to another embodiment of the invention, the two massage units 11 operate at different frequencies. This provides a broader spectrum of rotational massaging movement for a muscle. Furthermore, the massage units 11 will, when operated at different frequencies, provide an interference wave pattern which will act as a pumping motion which in turn will act as a pump increasing the flow of blood and remove waste products within a muscle. This will provide dual benefits for the massage according to massaging principles.

The fast, rotational massage motion provided by the main rotational movement of the two massage units 11 will stimulate the sympathetic nervous system, leading to increased muscle tone and hence strengthening of the muscle on which the massage is applied. Simultaneously the amplitude of the interference wave pattern will increase and decrease based on the constructive and the destructive interference of the two frequencies used, with each maximum of said amplitude occurring when the two separate frequencies align, creating a much slower propagating wave pattern in terms of amplitude. This slower moving wave pattern will aid muscle tissue relaxation during the treatment, as a slow deep longitudinal (in the direction of the muscle fibres) stretching stimulates nervous-system receptors and leads to reflexive relaxation of the muscle. The two separate massage units 11 working at different frequencies hence provides a very effective massage in regard to both toning stimuli and relaxation of the muscle at the same time. Furthermore, the slower moving interference wave pattern increases the blood flow within the muscle as an additional benefit to the massage. Preferably one of the massage units 11 will operate at or around 23 Hz, and the other massage unit 11 operates at an off-set frequency in the range of about 21 Hz to about 25 Hz. Even more preferably the second frequency is 22 Hz or 24 Hz, or around 22 Hz to around 24 Hz. This is due to 23 Hz or around 23 Hz being the most suitable frequency for stimulation of the muscles of the soft palate in the oral cavity, as shown in clinical studies in the field of BMS. The two separate frequencies may be achieved mechanically from a common drive means 5 in various ways known in the art, such as having a rotating transmission axis in engagement with gears of different sizes arranged to opposite shafts to each massage unit, or cam wheels with cam shaft of varying length or similar.

According to another embodiment of the invention wherein the two opposite placed massage units 11 operate at different frequencies, the length L of a distance 17 between the circumference 19 of the individual massage units 11 and their rotational axis 15 varies, whereby an additional sideways wave motion is provided by the device 1. The distance 17 is seen in a cross-sectional plane of each massage unit 11 and varies in size, the variation being in the range of about 0.5 mm to about 4 mm, e.g. from about 1 mm to about 2.5 mm, depending on an angle of said distance 17 originating from the rotational axis 15, giving rise to an asymmetrical rotation. The additional sideways wave motion is then provided as an effect of the asymmetrical rotation of the massage units 11 coupled with their different frequencies of rotation. A muscle fibre of a muscle being arranged between the two massage units 11 will be moved upwards and downwards as described in relation to their asymmetrical rotation about their rotational axis 15, however, as the frequency of the two separate massage units 11 are different, said upward and downward movement will also be unsynchronized. As a result, the two massage units 11 will alternate the direction of their engagement when acting on fibres of a muscle placed in engagement between said two massage units 11. When both massage units 11 are aligned at their maximum amplitudes and a constructive interference is achieved upwards, the muscle fibres will be pushed upwards as both massage units 11 push the muscle upwards from both left and right. On the contrary, when both massage units 11 are aligned at their minimum amplitudes and a constructive interference downwards is achieved, the muscle fibres will be released to the least amount of pressure on the muscle subjected by a user of the device 1. This can therefore be viewed as a downwards movement of the muscle fibres in relation to the maximum upwards motion. Between these two constructive interferences, the combined force applied on the muscle from the two massage units 11 will change direction depending on the respective alignments of the two individual massage units 11. If one of the massage units 11 is at its maximum height during the rotational massage movement while the other massage unit is at its minimum height, the resulting force applied to the muscle fibres located between the two massage units will be directed diagonally, up and towards the lower of the two massage units at that point in time. Respectively, the opposite will occur when the first massage unit is at its minimum, and the other massage unit 11 is at its maximum. Hence, the alternating height difference, being a result of the asymmetrical rotation and separate operating frequencies will push the muscle fibres, located between the two massage units 11, in a wave like movement going left and right coupled to the upward and downwards movement of said muscle. Thereby an additional stretching and massaging movement is provided by the device 1, further increasing the effectiveness of the massage provided by the device 1. Said additional left and right movement may therefore reach muscle fibres not being affected by the rotational massaging movement and the upward and downward movement, due to adding an additional dimension to the massage in relation to the muscle.

The device 1 may be used for the treatment of snoring by means of massaging the muscles in the oral cavity. By applying the two massage units 11 of the device to the muscles in the soft palate in an oral cavity of a person, the device 1 will when operated massage said muscles with an alternating rotating movement. Said alternating rotating movement will stimulate and massage those muscles which will result in a strengthening of said muscles, alleviating or eliminating snoring, which is a common issue due to said muscles becoming more flaccid over time. The device may further also be used in a similar fashion on the muscles acting on the tonsils, which further may aid in the treatment of snoring of a person. Moreover, the device may be used on the tongue in the treatment of apnea.

The invention further relates to a method for massaging muscles in the oral cavity using a device as herein described.

The device 1 according to the invention may further have additional features arranged thereto. For example, the device 1 may be arranged with a light device, arranged to illuminate the oral cavity when the device 1 is being used. By illuminating the oral cavity during use of the device the placement of the device 1 in relation to the muscle to be massaged is made easier for a user. Such a light device may be a LED light or another similar light source known in the art. Preferably the light source is arranged in proximity to the base of the extending element 9 and shines a light along said extending element towards the massage units 11.

Even further the invention relates to a method for reducing or eliminating snoring, the method comprising massaging muscles in the oral cavity using a device 1 according to the invention.

DETAILED DESCRIPTION OF THE DRAWINGS

Hereinafter different embodiments of the invention will be described in detail with reference to the accompanied drawings. Reference numbers present are not to be view as restrictive in relation to the scope of the protection given by the patent claims, only as assistance in understanding the various technical features of the invention presented in the drawings.

As should be realized the invention can be modified in various ways without deviating from the scope of the claims, and specific technical features and aspects of the invention described may be used individually, or be combined, to achieve a variety of combined technical features and embodiments of the invention. Hence, the drawings and the descriptions thereto are to be viewed as illustrative and not restrictive.

FIG. 1 schematically illustrates a perspective view of a device 1 according to the invention. The device 1 is designed for massaging muscles in the oral cavity, in particular the muscles in the soft palate of the oral cavity. The device 1 comprises a body 3 with drive means 5 and a power unit 7, wherein the drive means 5 and power unit 7 are held within the body 3, the body 3 acting as a casing for the internal operating mechanics of the device 1. The device 1 further comprises an extending element 9 detachably coupled to the body 3, wherein the extending element 9 comprises two substantially orb-shaped massage units 11, arranged on opposite sides of an end portion 13 of the extending element 9. The drive means 5 is arranged to transfer a rotating movement within the extending element 9, wherein said rotating movement is transferred to the two opposite massage units 11.

The massage units 11 are arranged so as to provide a rotating movement which may be applied to the muscles of the soft palate in the oral cavity, or to the tongue. The massage units 11 rotate about a rotational axis 15, being essentially perpendicular to the end portion 13 of the extending element 9. Said rotational movement about the rotational axis 15 is then applied to the muscles so as to use the rotational movement as stimuli and massage for said muscles as a way to strengthen and tone the muscle fibres of the muscle. The device 1 further comprises a user interface 21 for operating the device 1. The applied alternately rotating massage movement provided by the device 1 provides a non-interrupted continuous contact between the massage units 11 and the muscles when used, which gives rise to a very effective massaging treatment. The treatment of said muscles helps alleviate snoring, as a result of the strengthened muscle tissue. People having problems with snoring may therefore receive a fast and efficient treatment by the device 1 due to the alternately rotating movement providing a non-interrupted continuous stimulus for the muscle.

Figure 2A:
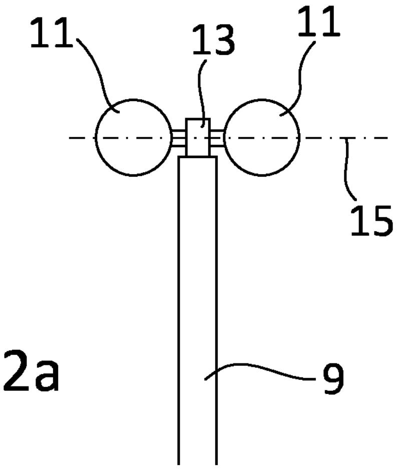
Figure 2B:
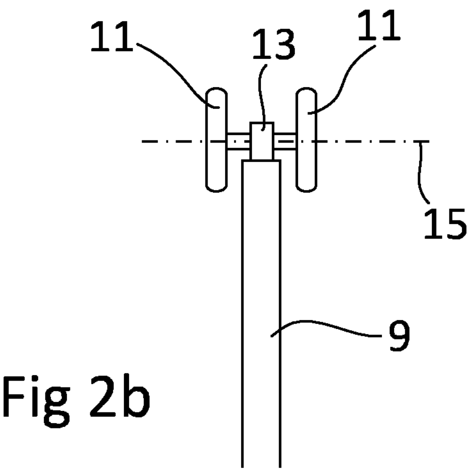
Figure 2C:
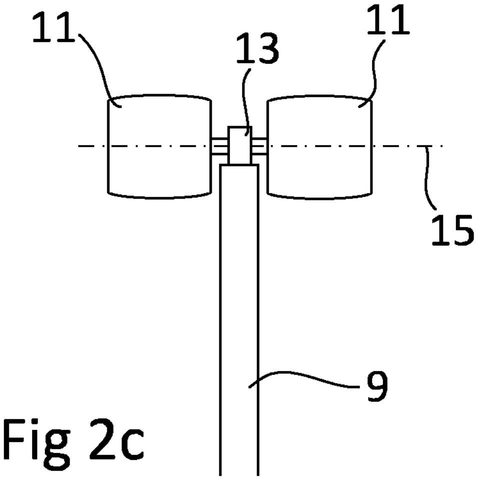

FIG. 2*a-c* schematically illustrates front views of alternative embodiments of massage units 11 of a device according to the invention. FIG. 2*a* shows the end portion 13 of the extending element 9, wherein two opposite substantially orb shaped massage units 11 are arranged about the rotational axis 15. FIG. 2*b* shows the end portion 13 of the extending element 9, wherein two opposite substantially disc shaped massage units 11 are arranged about the rotational axis 15. FIG. 2*c* shows the end portion 13 of the extending element 9, wherein two opposite substantially cylinder-shaped massage units 11 are arranged about the rotational axis 15. The different described shapes of the massage units 11 all have an essentially rounded shape when seen from a direction parallel to the rotational axis 15, providing a smooth and pleasant contact surface between the massage units 11 and the muscles being massaged by said massage units 11. The massage units 11 are preferably made of medical silicone to provide a firm but soft contact with the muscles. The size of the massage units 11 may vary in the range of about 5 mm in diameter to about 12 mm in diameter, wherein the size of the massage units 11 may be changed on the basis of personal preference and the size of the person using the device. The surface on the massage units 11 is further fine structured comprising sub-millimeter recesses and/or protrusions, which are arranged to increase the friction between the massage units 11 and the muscles tissue so as to provide better stimulation of the muscle.

Figure 3A:
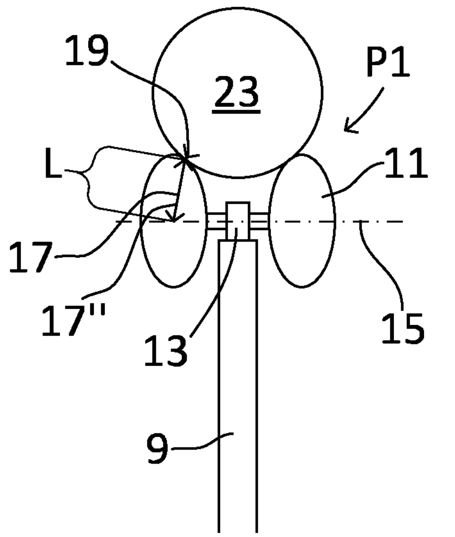
Figure 3B:
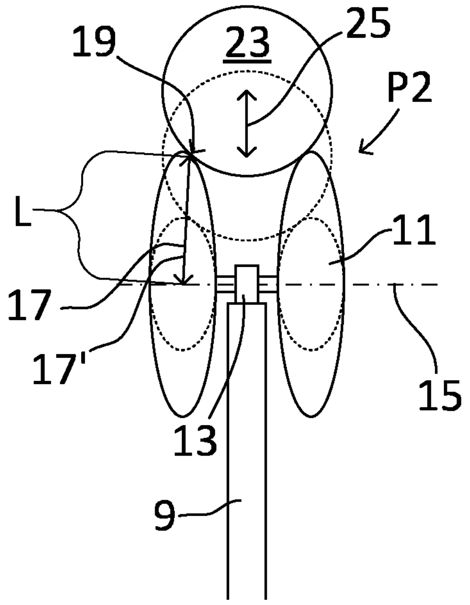
Figure 3C:
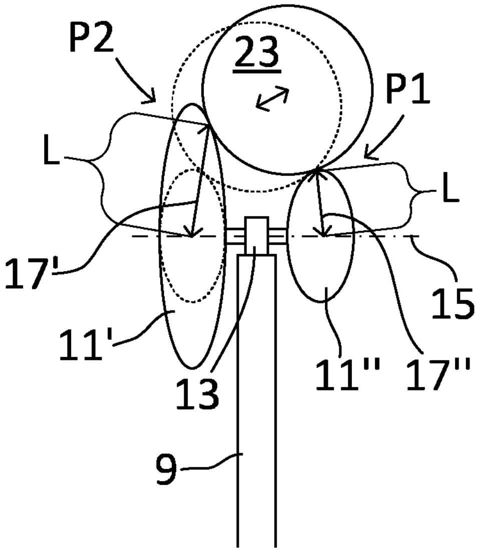
Figure 3D:
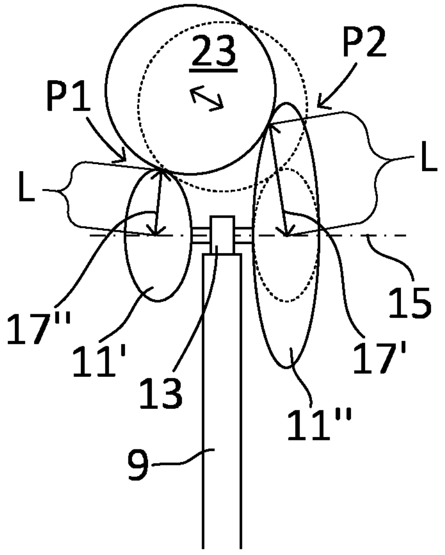

FIG. 3*a-d* schematically illustrates front views of massage units 11 in different rotational positions pushing a muscle in different directions according to the invention. FIGS. 3*a-d* all show an extending element 9 with two massage units 11 arranged at the end portion 13 of the extending element 9 on opposite sides. The figures further show a cross section of a portion of a muscle 23, extending in a direction substantially perpendicular to the rotational axis 15 and the extending element 9. Further, the massage units 11 rotate about the rotational axis 15 which is perpendicular to the extension of the end portion 13 of the extending element 9 so as to provide an alternating rotating massaging motion applied to the portion of the muscle 23. However, the massage units 11 of this example are shaped with an elliptical cross-sectional shape seen in a direction parallel to the rotational axis 15, which gives rise to an asymmetrical alternately rotation about the rotational axis 15. The massage units 11 may also be symmetrical in shape but instead be arranged off-center in relation to the rotational axis 15. The achieved effect is that a length L of a of distance 17 to the circumference 19 of a massage unit 11 and the rotational axis 15 changes depending on the rotational position of a massage unit 11. It should however be emphasized that FIGS. 3*a-d* are schematic and that the shapes are exaggerated to help illustrate the principle of the invention. Furthermore, the massage units 11 shown in FIGS. 3*a-d* are operated at different rotation frequencies, wherein the rotational movement alternates direction between clockwise and anti-clockwise, wherein each total rotational displacement comprises a maximum distance 17' to the circumference 19 and a minimum distance 17" to the circumference 19. Said distance 17 is to be seen as the closest possible direction towards the portion of the muscle 23 which the massage units 11 are in contact with when the device is operated. FIG. 3*a* shows a situation where both massage units 11 are in a first position P1, where they are aligned in their minimum amplitude which provides the minimum distance 17" to the portion of the muscle 23. In this first position P1 the portion of the muscle 23 located between the two massage units 11 is at its lowest point and subjected to equal pressure from the two massage units 11. Turning to FIG. 3*b*, the two massage units are in a second position P2, wherein both massage units 11 are at their maximum amplitude which provides the maximum distance 17' to the portion of the muscle 23, the first position P1 being drawn with dotted lines for reference. When the two massage units 11 move from the first position P1 to the second position P2, the portion of the muscle 23 is moved upwards, which provides a stretching of said portion of the muscle 23 which enhances the massage provided by the device. A total height displacement 25 of a portion of the muscle 23 being moved between the first and second positions P1, P2 of the massage units 11 is typically in the range of about 0.5 mm to about 4 mm, e.g. 1 mm to about 2.5 mm. As should be obvious, the height displacement 25 provided by a massage unit is a result of the combination of the angular displacement of a massage unit 11 and its shape. The same height difference 25 may be achieved by a massage unit 11 having a slightly asymmetrical shape wherein the total rotational displacement is large, such as in the range of about 150° to about 180°. And on the contrary, a massage unit 11 may have a sharper curvature, being more elliptical, and have a shorter total angular displacement, such as in the range of about 30° to about 50°. As the two massage units 11 are operated at different frequencies, preferably one being operated at or around 23 Hz and the other at or around 22 Hz or at or around 24 Hz, their alignment will only be temporary and gradually the amplitudes of the two massage units 11 will shift to be in a destructive upwards inference in relation to each other. FIG. 3*c* shows a situation where a first massage unit 11' is in the second position P2 and a second massage unit 11" is in the first position P1. The resulting force applied to the portion of the muscle 23 will hence be in a direction diagonally up and right, away from the first massage unit 11' as only the first massage unit 11' pushes the portion of the muscle 23 upwards. FIG. 3*d* shows a situation mirrored to the situation shown in FIG. 3*c*, wherein the portion of the muscle 23 is instead pushed diagonally up and left, away from the second massage unit 11". As is seen in FIGS. 3*a-d*, the device according to the invention may provide a back and forth massaging rotational movement to a portion of a muscle 23, and at the same time move the portion of the muscle 23 in a wave like motion up and down, which up and down movement is moreover tilted, altering left and right, due to the asymmetrical and unsynchronized rotation of the massage units 11. Thereby the portion of the muscle 23 subjected to the massage treatment provided by the device is stretched in three dimensions while still being subjected by a continuous and non-interrupted massaging movement. This means, when the device is used for massaging the muscles in the soft palate of the oral cavity of a person, that the massage units are easier to hold in place and that muscles may be stimulated without creating a reactive force moving the device away from the muscle. In summary, a very efficient massage is provided, characterized in a treatment procedure that may have a very short time span, due to the simultaneously applied rotating and wave-like motions on the muscle.

As should be realized, the components and features specified above may within the framework of the invention be combined between the different embodiments specified.

The invention claimed is:

1. A device for massaging muscles in the oral cavity comprising a body with drive means and a power unit, and an extending element detachably coupled to the body, wherein the device comprises two massage units, each arranged on a rotational axis that is essentially perpendicular to an end portion of the extending element, each massage unit comprising a solid body wherein at least one of the two massage units comprises an elliptical shape when viewed in a direction along the rotational axis, wherein the massage units operate with a rotating movement around the rotational axis, and wherein the rotating movement of the massage units is an alternating rotation, alternating between a clockwise and an anti-clockwise rotational angular displacement.

2. The device according to claim 1, wherein the two massage units operate at different frequencies.

3. The device according to claim 2, wherein one of the massage units operates at about 20 Hz to about 26 Hz, and the other massage unit operates at an off-set frequency in the range of about 22 Hz to about 24 Hz.

4. The device according to claim 1, wherein a total angular displacement of at least one of the two massage units for a complete rotational displacement in each respective direction is 180° or less.

5. The device according to claim 1, wherein each of the massage units comprises a circumference viewed in a direction along the rotational axis, and wherein a length (L) of a distance between the circumference of at least one of the two massage units and the rotational axis varies in size, the variation being in the range of about 0.5 mm to about 4 mm, depending on an angle of said distance originating from the rotational axis.

6. The device as in claim 4 wherein the total angular displacement of the at least one of the two massage units for a complete rotational displacement in each respective direction is 80° or less.

7. The device as in claim 4 wherein the total angular displacement of the at least one of the two massage units for a complete rotational displacement in each respective direction is 60° or less.

8. The device as in claim 4 wherein the total angular displacement of the at least one of the two massage units for a complete rotational displacement in each respective direction is 40° or less.

9. A method for massaging muscles in the oral cavity using a device comprising a body with drive means and a power unit, an extending element detachably coupled to the body, wherein the device comprises two massage units each arranged a rotational axis that is essentially perpendicular to on an end portion of the extending element, each massage unit comprising a solid body wherein at least one of the two massage units comprises an elliptical shape when viewed in a direction along the rotational axis, wherein the massage units operate with a rotating movement around the rotational axis and wherein the rotating movement of the massage units is an alternating rotation, alternating between a clockwise and an anti-clockwise rotational angular displacement, wherein the method comprises the steps of:

engaging the massage units with said muscles, and massaging the muscles in the oral cavity with the rotating movement.

10. The method of claim 9 used for reducing or eliminating snoring.

11. The method of claim 9 used for reducing or eliminating apnea.

* * * * *